United States Patent [19]

Williamson

[11] 4,174,923

[45] Nov. 20, 1979

[54] WIND DRIVEN ENGINE

[76] Inventor: Glen A. Williamson, Wagner, County of Phillips, Mont. 59543

[21] Appl. No.: 798,294

[22] Filed: May 19, 1977

[51] Int. Cl.² .............................................. F03D 3/02
[52] U.S. Cl. ...................................... 415/2; 416/121; 416/122
[58] Field of Search ...................................... 415/2–4, 415/60, 65; 416/122, 121 A

[56] References Cited

U.S. PATENT DOCUMENTS

| 264,164 | 9/1882 | Jackson | 415/4 X |
|---|---|---|---|
| 302,769 | 7/1884 | Pallausch | 416/119 |
| 419,345 | 1/1890 | Otto | 415/3 |
| 571,056 | 11/1896 | Thompson | 416/119 |
| 715,985 | 12/1902 | Cochran | 416/121 A |
| 756,616 | 4/1904 | Fornander | 416/121 A |
| 2,335,817 | 11/1943 | Topalov | 415/2 |
| 2,379,324 | 6/1945 | Topalov | 415/3 |
| 3,965,679 | 6/1976 | Paradiso | 415/2 X |
| 4,045,500 | 2/1978 | Oman et al. | 415/2 X |
| 4,084,918 | 4/1978 | Pavlecka | 415/2 X |

FOREIGN PATENT DOCUMENTS

| 384349 | 11/1923 | Fed. Rep. of Germany | 415/2 |
|---|---|---|---|
| 453231 | 12/1927 | Fed. Rep. of Germany | 416/122 |
| 810500 | 8/1951 | Fed. Rep. of Germany | 416/121 A |
| 820280 | 11/1951 | Fed. Rep. of Germany | 416/122 |
| 539171 | 6/1922 | France | 416/119 |
| 2300235 | 10/1976 | France | 415/2 |

Primary Examiner—Everette A. Powell, Jr.
Attorney, Agent, or Firm—Paul J. Van Tricht

[57] ABSTRACT

A wind driven engine comprising a base, a housing which is rotatably mounted on the base, and two vertical rotors which are rotatably mounted in the housing and which are substantially enclosed by the housing. The blades of the vertical rotors overlap. An air diverter is centrally mounted inside the housing and in front of the rotors so as to divert air entering the housing onto the blades of the rotors which are adjacent the sides of the housing. The air diversion results in contra-directional rotation of the rotors, i.e., one rotor rotates clockwise and the remaining rotor rotates counter-clockwise. An air vent is centrally placed in the housing above the air diverter to evacuate air from behind the air diverter. The vent is enclosed by an air shield which aids the evacuation of air through the vent. The contra-directionally rotating rotors are mechanically joined to an energy receiving system so as to be substantially self-timing and torque-free.

2 Claims, 5 Drawing Figures

WIND DRIVEN ENGINE

BACKGROUND OF THE INVENTION

1. Field of the Invention

This invention relates to wind driven engines and wind turbines. More specifically, this invention relates to wind driven engines with two vertical, overlapping, contradirectionally rotating rotors which are enclosed by a housing and are mechanically joined to an energy receiving system.

2. Description of the Prior Art

The prior art is illustrated by the following U.S. Pat. Nos. 3,924,966; 3,902,072; 3,883,750; 3,876,925; 3,793,530; 989,509 and 757,800.

As these patents illustrate, vertical and horizontal rotors have long been used in wind engines and motors. Housings of various sorts also have been used to enclose wind fans and turbines. The prior art clearly illustrates that the major problem in wind engines and machines is the efficient extraction of the maximum power from the wind available to the engine. The present invention more efficiently extracts power from the available wind by the use of two overlapping, vertical rotors which are enclosed in a housing with a centrally mounted air diverter.

SUMMARY OF THE INVENTION

The present invention is a wind driven engine which is comprised of a base, a housing which is rotatably mounted on the base, and two vertical rotors which are rotatably mounted in the housing and are substantially enclosed by the housing. The housing includes a V or wedge-shaped air diverter which is centrally mounted inside the housing in front of the two rotors and which divides the air flowing into the housing into two air streams. The air streams strike the blades of the rotors which are adjacent the sides of the housing. This air diversion results in contradirectional rotation of the rotors, i.e., one rotor rotates clockwise and the remaining rotor rotates counterclockwise. The housing is provided with an air vent which is centrally located above the air diverter. The air vent is covered by a wedge or cone-shaped air hood or shield which aids air evacuation from the vent. The contradirectional rotating rotors are mechanically joined to an energy receiving system so as to be substantially self-timing and torque-free.

DESCRIPTION OF THE PREFERRED EMBOBIMENT

Figure 1:
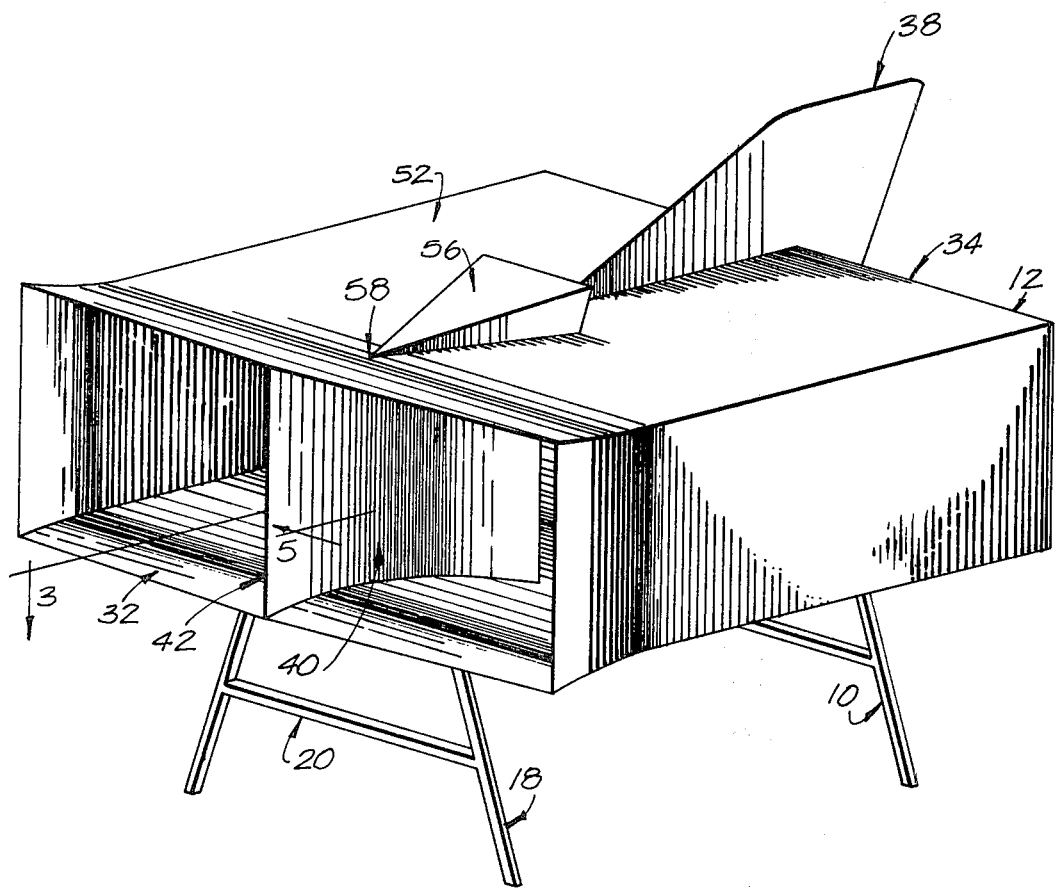
FIG. 1 is a perspective view of a wind driven engine of the present invention.
Figure 2:
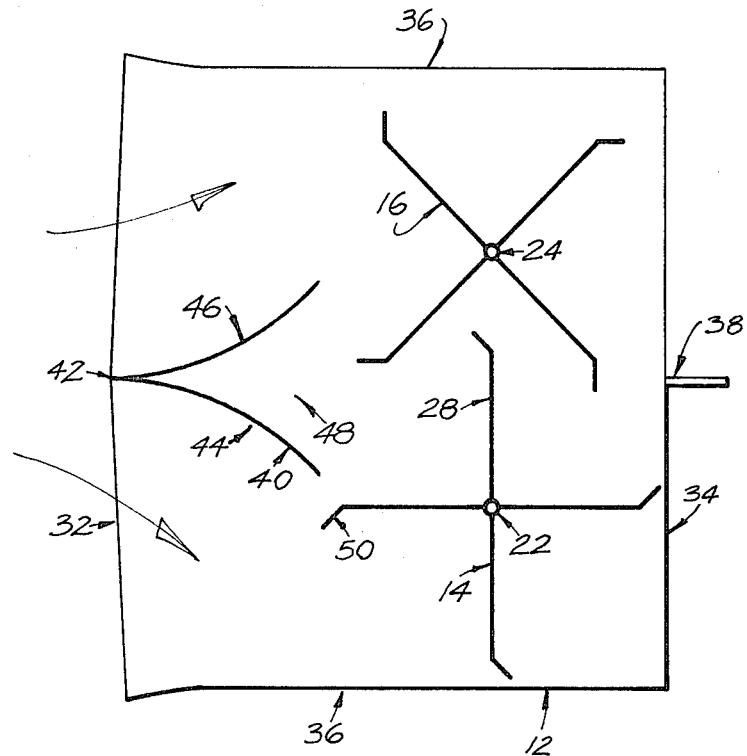
FIG. 2 is a sectional view taken at the line 3—3 of FIG. 1.

Referring now to FIGS. 1 and 2, the wind driven engine of the present invention comprises a base 10, a housing 12 which is rotatably mounted on the base 10, and two vertical rotors 14 and 16 which are rotatably mounted in the housing 12.

Figure 3:
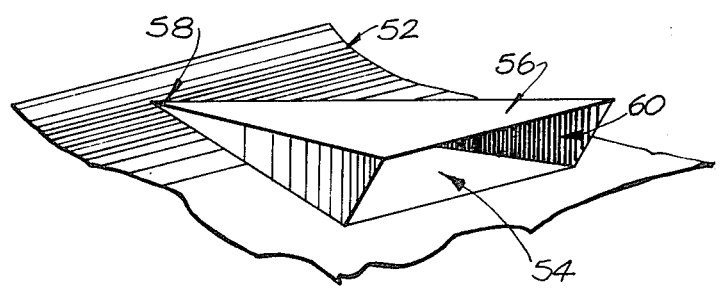
FIG. 3 is a perspective view of the air vent and air vent shield of the present invention.

Referring also to FIG. 3, the base 10 is a rigid structure, e.g., a steel or wooden tower and the like, with a plurality of vertical supports 18, e.g., legs, and horizontal supporting structures 20, e.g., struts or platforms. The shafts 22 and 24 of the rotors 14 and 16, respectively, are mounted on, and extend through, the housing 12 by means of ball or roller bearings 26 and the like. On the rotor shafts 22 and 24 are mounted a plurality of rotor blades 28. The blades 28 of the rotors 14 and 16 mutually overlap.

Figure 4:
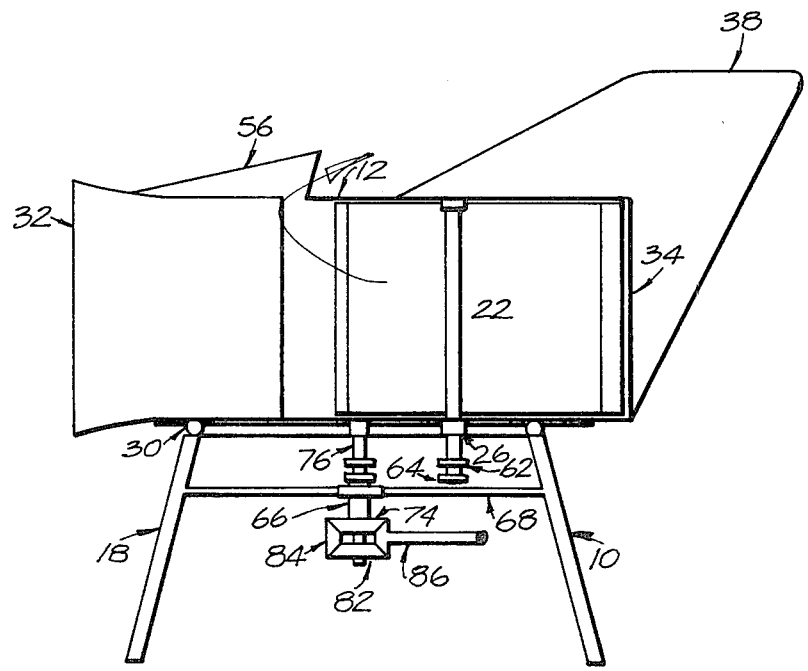
FIG. 4 is a sectional view taken on the line 5—5 of FIG. 1.

Referring now to FIG. 4, the housing 12 is substantially rectangular with at least two sides and is rotatably mounted on the base 10 by means of rollers which run on a circular track 30 on the base 10. Alternatively, the housing 12 may be mounted on the base 10 by means of thruster bearings, over and under rollers, pivot tubes and the like. The housing 12 has an upstream or front air opening or inlet 32 and a downstream or rear air opening or outlet 34. Between the two openings 32 and 34 of the housing 12 a chamber is defined which substantially encloses the two rotors 14 and 16. The air inlet 32 may be flared to increase the amount of air entering the housing 12. The sides 36 of the housing 12 may converge from the inlet 32 to a point opposite the rotor shafts 22 and 24 and diverge to the outlet 34, thereby forming a Venturi-shaped chamber to increase air velocity. A vertical stablizer or wind vane 38 is mounted on the rear end of the housing 12. The wind vane 38 directs the housing's air inlet 32 into the wind.

A wind diverter 40 is approximately centrally mounted inside the housing 12 between the air inlet 32 and the rotors 14 and 16. The air diverter 40 is a V or wedge-shaped body which extends vertically from the top to the bottom of the housing 12. The tip 42 of the air diverter 40 extends to the air inlet 32 of the housing 12. The sides 44 and 46 of the air diverter 40 diverge from the tip 42 of the air diverter 40 into the central portion of the housing 12 and are preferably concave to accentuate the diversion of air onto the blades 28 of the rotors 14 and 16 which lie adjacent the sides 36 of the housing 12. The open base 48 of the air diverter 40 encompasses the approximate central one-fourth to one-third of the housing 12. In operation the air diverter 40 divides and concentrates the air which enters the air inlet 32 of the housing 12 into two distinct air streams and directs the air streams against the rotor blades 28 which are adjacent the sides 36 of the housing 12. The contact of the two air streams with the rotor blades 28 produces contradirectional rotation of the rotors 14 and 16, i.e., one of the rotors 16 rotates clockwise and the other rotor 14 rotates counterclockwise. The concentration of the air flow onto the outer blades 28 of the rotors 14 and 16 increases the power produced by the rotors 14 and 16. The tips 50 of the rotor blades 28 are bent in a direction which is in the direction of the diverted air streams so as to provide an initial "kick" to the rotors 14 and 16 as the blades 28 enter the diverter air streams. By overlapping the blades 28 of the rotors 14 and 16, it is possible to increase the diameter of the individual rotors 14 and 16 and, thereby, increase the power and efficiency of the wind driven engine.

Referring now to FIGS. 1, 3 and 4, the top 52 of the housing 12 includes an air vent 54 which is centrally located over the air diverter 40. The air vent 54 evacuates air from inside the air diverter 40 and, thereby, prevents the build up of air pressure behind the air diverter 40. The air vent 54 is covered by a wedge or cone-shaped air shield or hood 56. The front of the air shield 56 is enclosed and directed toward the air inlet 32 of the housing 12. The rear or base 60 of the air shield 56 is open at a point upstream of the rotors. In operation air flowing over the air shield 56 creates an air depression or pocket behind the open base 60 and, thereby, sucks air through the vent 54.

Figure 5:
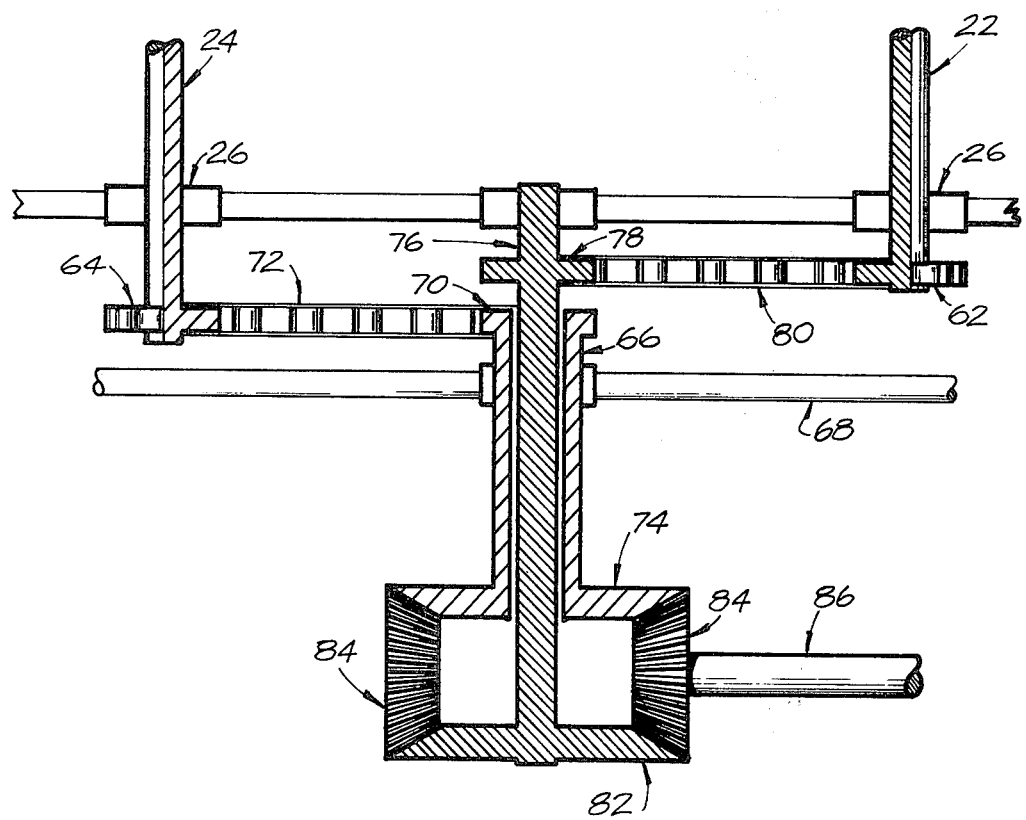
FIG. 5 is a sectional view of the mechanism which joins the two rotors of the present invention.

Referring now to FIGS. 4 and 5, which illustrate a preferred means for mechanically joining the two contradirectionally rotating rotors 14 and 16, horizontal planar gears or sprockets 62 and 64 are attached to the ends of the rotor shafts 22 and 24, respectively, which extend beneath the housing 12. The gears 62 and 64 are in parallel but distinct horizontal planes. A hollow shaft 66 is rotatably mounted on a horizontal support 68 of the base 10. The hollow shaft 66 is centrally located beneath the housing 12 and equidistant from the two rotor shafts 22 and 24. A horizontal ring gear or sprocket 70 is attached to the upper end of the hollow shaft 66 above the horizontal support 68. The lower of the two horizontal planar gears 64 is mechanically joined to the hollow shaft's ring gear 70 by a non-slipping mechanical means 72, e.g., a chain drive, a set of gears, or the like. The lower end of the hollow shaft 66, which rotatably extends through the horizontal support 68, is attached to a downward projecting ring bevel gear 74. A second shaft 76 is rotatably mounted on the housing above the hollow shaft 66. The second shaft 76 extends through the hollow shaft 66 and beneath the hollow shaft's ring bevel gear 74. A horizontal ring gear or sprocket 78 is mounted on the second shaft 76 between the housing 12 and the top of the hollow shaft 66. The second shaft's ring gear 78 is mechanically joined to the remaining rotor shaft's planar gear 62 by a non-slipping mechanical means 80, e.g., a chain drive, a set of gears, and the like. The end of the second shaft 76, which extends beneath and is adjacent to the hollow shaft's bevel gear 74, is attached to an upward projecting ring bevel gear 82 with the approximate same exterior diameter as the hollow shaft's bevel gear 74. The second shaft's bevel gear 82 and the hollow shaft's bevel gear 74 are mechanically joined by a series of one or more bevel gears 84. One of the bevel gears is joined to a shaft 86 which connects to an energy receiving system, e.g., an electrical generator, a motor, and the like.

The foregoing is considered as illustrative only of the principles of the invention. Further, since numerous modifications and changes will readily occur to those skilled in the art, it is not desired to limit the invention to the exact construction and operation shown and described above. It is understood that the scope of the present invention is to be measured only by the limitations of the several claims appended hereto.

I claim:
1. In a wind driven engine having:
   (a) a base;
   (b) a housing rotatably mounted on said base, said housing including a front inlet opening, a rear outlet opening, and at least two sides;
   (c) a first and second vertical rotor rotatably mounted in said housing and having a plurality of overlapping blades;
   (d) a wedge-shaped air diverter approximately centrally mounted inside said housing and forward of said first and second vertical rotors so that the flow of air which enters said housing is diverted onto the blades of said rotors which are adjacent the sides of said housing thereby rotating one of said rotors clockwise and the remaining rotor counterclockwise;
   (e) a vent in said housing which is centrally located over said air diverter; and
   (f) means for mechanically joining said clockwise rotating rotor and said counterclockwise rotating rotor to an energy receiving system; said joining means comprising:
   (g) a first hollow shaft rotatably mounted on said base, said hollow shaft being mechanically joined to said first vertical rotor;
   (h) a first gear means attached to an end of said hollow shaft;
   (i) a second shaft rotatably mounted above and extending through said hollow shaft and first gear means, said second shaft being mechanically joined to said second vertical rotor;
   (j) a second gear means attached to the end of said second shaft which extends through and is adjacent to said first gear means; and
   (k) means for mechanically joining said first and second gear means;
   the improvement comprising:
   a wedge-shaped air shield which covers said air vent, the apex of said air shield is closed and projects forward toward said inlet opening, and the rear of said shield is open at a point upstream of said rotors.

2. A wind driven engine of claim 1 wherein the tips of said rotor blades are bent in the direction of said air flow.

* * * * *